(12) United States Patent
Eisenmann et al.

(10) Patent No.: US 6,336,128 B1
(45) Date of Patent: Jan. 1, 2002

(54) DATA-PROCESSING-AIDED ELECTRONIC CONTROL SYSTEM FOR A MOTOR VEHICLE

(75) Inventors: Joachim Eisenmann, Suessen; Martin Huber, Kornwestheim; Philipp Lanches, Esslingen; Hans-Juergen Aminger, Ebersbach; Matthias Koehn, Metzingen, all of (DE)

(73) Assignees: DaimlerChrysler AG, Stuttgart (DE); International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/184,858

(22) Filed: Nov. 3, 1998

(30) Foreign Application Priority Data

Nov. 3, 1997 (DE) ......................... 197 48 536

(51) Int. Cl.[7] .............................................. G06F 13/00
(52) U.S. Cl. ........................... 709/200; 709/201; 713/1
(58) Field of Search ................................ 709/200, 201, 709/221, 224, 203, 209; 713/1, 3

(56) References Cited

U.S. PATENT DOCUMENTS 5,491,800 A * 2/1996 Goldsmith et al. ......... 709/201
5,515,508 A * 5/1996 Pettus et al. ................ 709/200
5,715,453 A * 2/1998 Steward ........................ 713/1

OTHER PUBLICATIONS

Kuschke D. et al., *Softwareschnitstelle SPS–Interbus–S*, Elektrie, Berlin 48 (1994), pp. 26–30.

Orfali R. et al., *Client/Server programming with OS/2 2.0*, 2nd Ed., (1992) pp. 10–14, 165–167.

* cited by examiner

*Primary Examiner*—David Wiley
*Assistant Examiner*—Khanh Quang Dinh
(74) *Attorney, Agent, or Firm*—Crowell & Moring LLP

(57) ABSTRACT

A data-processing-aided electronic control system having a multiple control unit arrangement which implements application functions and has several control units arranged in a distributed manner, along with a data transmission network which connects the control units to each other. The application functions are implemented in a client/server architecture in the multiple control unit arrangement. This permits the implementation of application functions in real time via a flexible, standardized and open system. With this changes and/or updates of application functions can be implemented at relatively low expenditures. The system is used, for example, as a control system in a motor vehicle.

21 Claims, 11 Drawing Sheets

DATA-PROCESSING-AIDED ELECTRONIC CONTROL SYSTEM FOR A MOTOR VEHICLE

BACKGROUND AND SUMMARY OF THE INVENTION

This application claims the priority of German application No. 197 48 536. 7, filed Nov. 3, 1997, the disclosure of which is expressly incorporated by reference herein.

The invention relates to a data-processing-aided electronic control system, having a multiple control unit arrangement which implements application functions and has several control units which are arranged in a distributed manner. The system has a control data transmission network which connects the control units to each other. The term "control system" is used in a broader sense to also include automatic control systems.

Control systems of this type are used, for example, in motor vehicles for performing control functions which are typically found in vehicles. In conventional systems, the control units are each specifically designed for one or several application functions. The implementation of a new vehicle function requires the design of a new respective control unit. Together with a new sensor and actuator configuration, this new control unit must then be installed in the vehicle.

Although the control units in modern configurations are networked, for example, via a CAN bus, no explicit interface exists for access to individual function components. As a result, the entire respective application function appears to the control unit. For implementing new so-called recombined functions, which are built from existing functions, the explicit interface must therefore be manually connected to existing functions, at a resulting high cost. This is accomplished, for example, by defining or changing corresponding CAN messages. Further disadvantageously, in order to add a single new function, this sometimes requires the changing of all of the other control units.

Together with the trend toward increasingly electronically implemented functions in motor vehicles and their increasing mutual coupling, a significant rise in complexity occurs, along with a corresponding difficulty in the development and mastery of the entire electronic system of the vehicle. Additionally, this leads to a rising demand for computing power and memory capacity. Moreover, as a result of the increasing complexity while there are simultaneously more and more series and shorter development times for these series, it is required that components should increasingly be capable of being used again in a series-spanning manner.

From pure data processing systems with distributed computer capacities, for example, for office communications and in largescale computer systems, it is known to provide so-called client/server architectures. These are used to provide, in a centralized manner, a respective service by a server (designed for this purpose) to clients requesting this service. Generally in the case of these systems, there is no real-time processing.

It is therefore an object of the present invention to provide a control system that can be used, in particular, for motor vehicles and which is also suitable for implementation of application functions in real time while requiring a relatively small computing capacity. The control system is designed to be as flexible, standardized and open as possible in order to be able to implement changes and/or updates. This is particularly true with respect to the implementation of new application functions and/or modifications of existing application functions at comparatively low expenditures.

These and other objects and advantages are achieved by providing a control system having a multiple control unit arrangement that implements application functions and which has several control units which are arranged in a distributed manner. Here, a data transmission network interconnects the several control units to each other. In this data-processing-aided electronic control system, the application functions which are implemented by the system are implemented into the multiple control unit arrangement in the form of a client/server architecture. Here, the client/server architecture is used in a so-called embedded system. Specifically, the client/server architecture is used in a system in which the electronic data processing functionality is embedded in a superset system while supporting this system, and does not appear directly to the user. An example of such a superset system is a vehicle electronic system that performs vehicle functions.

By transferring the client/server architecture known from data processing systems to the present control system, a model for the structuring of distributed applications is provided which is particularly well suited for describing event-oriented systems. Here, in contrast to conventional systems, the interfaces between client processes and server processes are primarily oriented according to services and not according to data. Via the present system, the application functions can be developed independently of the hardware and recombined relatively easily to thus produce new, higher-level application functions.

Within the framework of the client/server architecture, application functions are described which communicate with one another via defined application protocol interfaces. For this purpose, at the present time of the design, no information is currently provided concerning the type of physical communication. As a result, via the control system according to the invention, application functions can be performed in real time and implemented comparatively easily into various system designs, for example, in different series vehicles. Because of the use of the client/server architecture models, the electronic infrastructure of the control system has a flexible, standardized and open base architecture and is also particularly suited for systems with comparatively small computing power resources and inflexible software configurations. For details concerning the type of physical communication, reference is made to copending application Ser. No. 09/192,215, filed Nov. 16, 1998, titled Processor Unit for a Data-Processing-Aided Electronic Control System in a Motor Vehicle, the disclosure of which is expressly incorporated by reference herein.

In an embodiment of the control system according to the invention, the client/server architecture for a respective application function contains a function monitoring level which is situated between a client level and a server level. This function monitoring manages the global condition of the application function and therefore operates as its central switching point or memory.

In a further embodiment of the control system according to the invention, one or several of three levels, i.e., function monitoring, client or server level, is further structured in a special manner. Here, the client level may consist of requesters as sources of service demands and primary clients connected behind them. Analogously, the server level may be constructed of primary servers and fulfillers connected behind them. A primary client and the pertaining requester, or a primary server and the pertaining fulfiller, are always arranged in the same control unit. The monitoring level contains a function monitor which communicates with the primary clients, manages the global condition of the application function and monitors thereof for the management of partial functions.

The design of a function is based on a plurality of defined design elements, for example, methods and protocols, service access points and service access point interfaces, ports and port interfaces, connections, processes, frames and firmware processes.

In still another embodiment according to the invention, the service access points are characteristically designed such that they form interfaces of application processes to the layer of the ISO/OSI reference model and contain one protocol, in the monitoring client role and in the server role respectively.

In still another embodiment of the invention, the ports are designed as anchoring points for bidirectional client/server communication connections for the implementation time. These ports also represent a horizontal communication interface on the monitoring layer of the ISO/OSI reference model.

In an even further embodiment according to the invention, the processes, as design elements which contain the actual application software, are specially constructed as an outer interface, an inner structure and a specific response upon arriving service requests.

In still a further embodiment of the present invention, the control system has a real-time-capable multitasking operating system in the control units. Here, the client/server processes are implemented such that, without any direct hardware access, they utilize only the services of the operating system and a pertaining communication layer. This communication layer is based on the so-called remote procedure call (RPC) technique. With respect to this type of RPC technique, RPC is known from data processing systems with a client/server architecture for such a communication between client/server processes.

In yet a further embodiment according to the invention, a corresponding RPC library is provided which contains a complete server code that is integrated exactly once per control unit and processed by all client and server processes. This minimizes resource requirements and simultaneously maximizes the reusability.

According to a further embodiment of the invention, the initialization of the server takes place in four special phases.

According to another embodiment of the invention, the remote procedure call (RPC) is implemented as a synchronous RPC, an asynchronous RPC or a one-way RPC.

In still another embodiment of the invention, a minimal or resource-optimized protocol implementation is provided which assigns an identifying service number to each method. Here, the message type, as well as the service number and the transferring data are coded in the user data of the transmitted messages or application data. The thus implemented protocol can be used, for example, on a CAN bus.

Other objects, advantages and novel features of the present invention will become apparent from the following detailed description of the invention when considered in conjunction with the accompanying drawings.

DETAILED DESCRIPTION OF THE DRAWINGS

Figure 1:
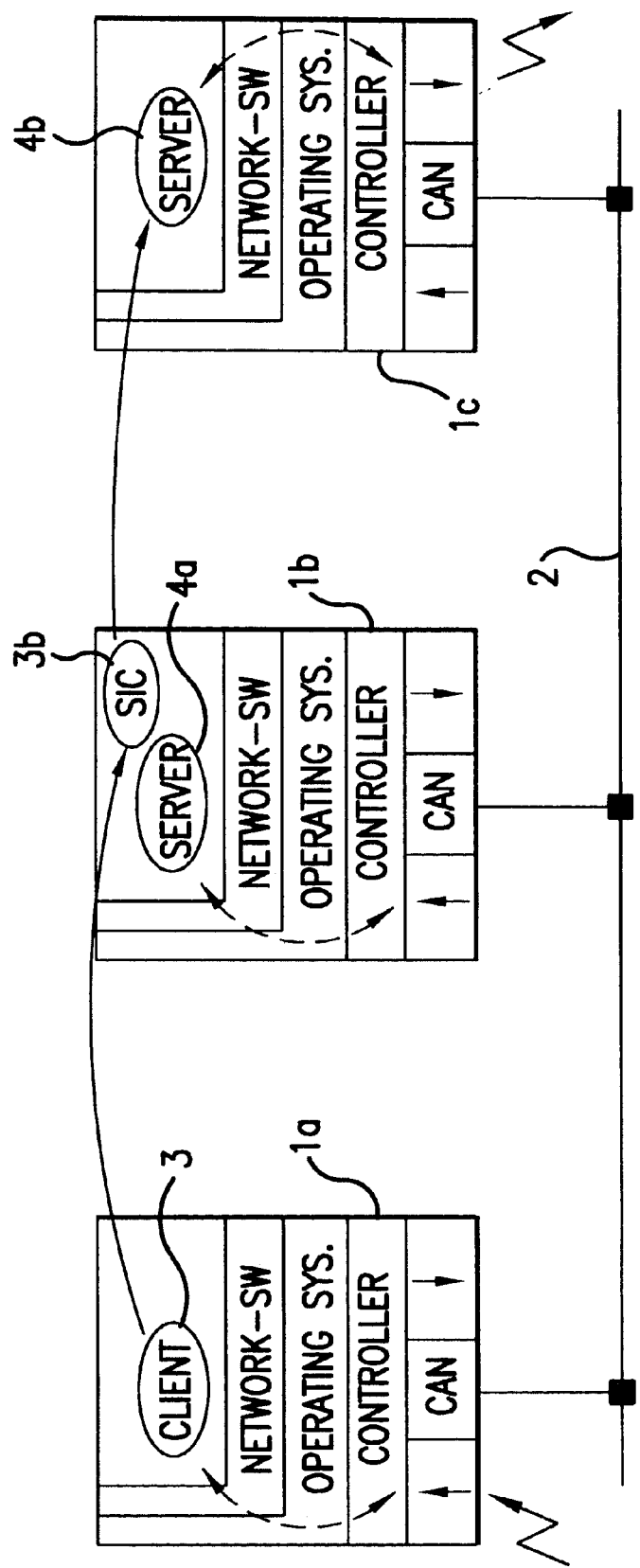
FIG. 1 is a schematic block diagram representation of a multiple control unit arrangement of a motor vehicle control system.

FIG. 1 is a block diagram of a portion of the system illustrating several control units 1a, 1b, 1c, which are arranged in a distributed fashion. Further shown is a data transmission network which connects these units. The data transmission network uses a data bus 2 for implementing distributed application functions in a motor vehicle (for example, a CAN bus of a multiple control unit arrangement). In the multiple control unit arrangement of this control system, the application functions are implemented in the form of a client/server architecture (CSA). In this architecture, all system interfaces are described and communication with the objects takes place and data is exchanged only via the objects. To the extent that this client/server architecture, with respect to its structure and its components, corresponds to the conventional client/server architectures, it will not be discussed in detail in the following. Instead, reference will be made to the corresponding literature and the corresponding terminology will be used.

Via this architecture, a portability of the software between various hardware platforms is achieved. The utilization of a construction-from-parts setup, known from conventional object-oriented methods, can ensure that program parts which have been specified, implemented and tested once can always be used again. Further, by the implementation of the communication on the basis of a remote procedure call (RPC), an assurance that individual processes can be arbitrarily distributed in the control unit network is achieved. This is accomplished without requiring a manual adaption of the designed functions or the implemented software.

FIG. 1 illustrates an example of how an application consisting of a client process 3, a function monitor 3b and a server process 4b can be distributed on the control units 1a, 1b, 1c in this manner. An additional server 4a is not part of this client/server chain. The function monitor 3b operates as a server (with respect to the client 3) and as the client (with respect to the server 4b).

Figure 2:
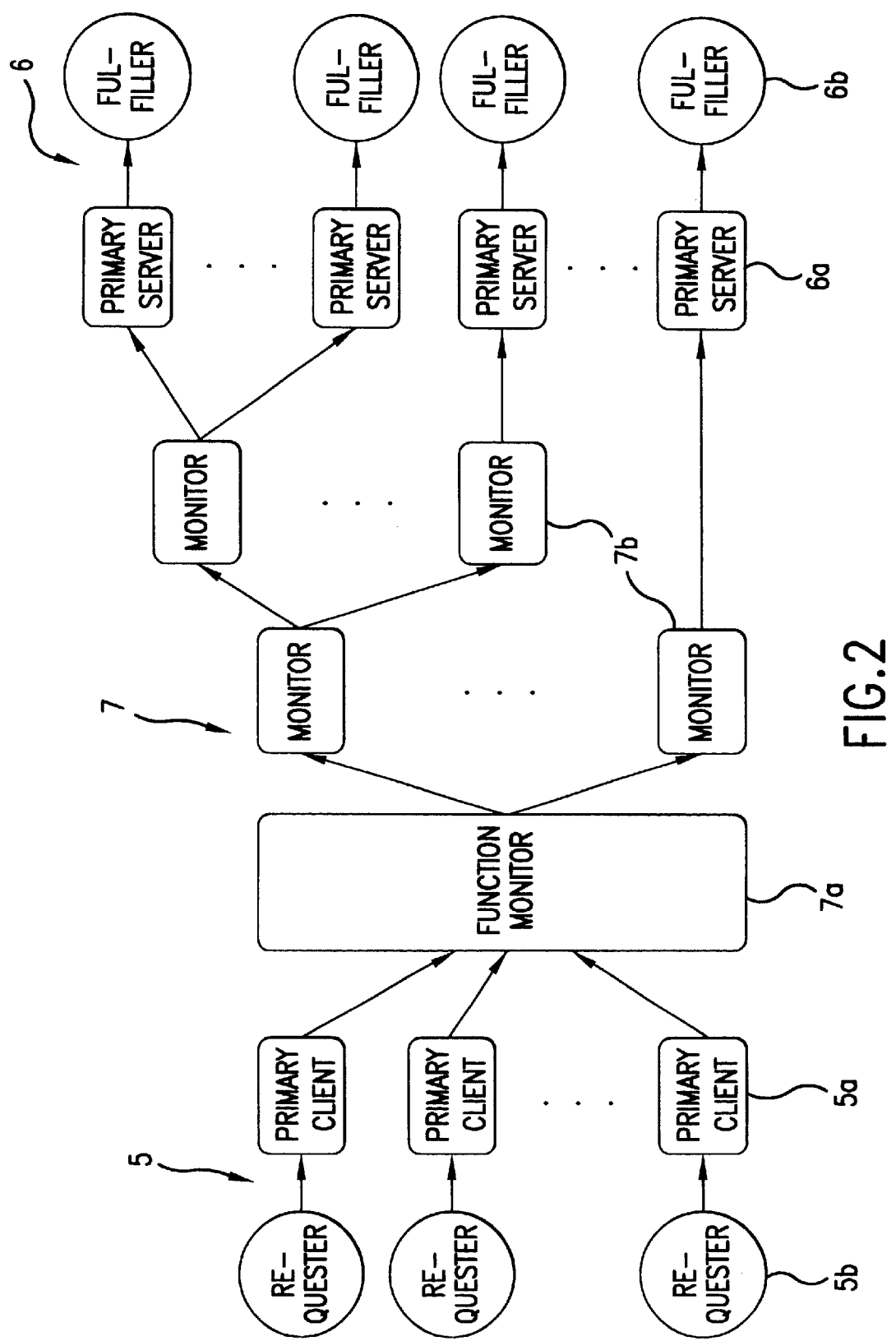
FIG. 2 is a block diagram representation of the design structure of a client/server architecture implemented in the control system of FIG. 1.

The block diagram, shown in FIG. 2, represents the system design of a respective application function within the framework of the client/server architecture used according to the invention. According to this system design, the respective application function is structured into a client level 5, a server level 6 and a function monitoring level 7 situated there between. The client level 5 contains one or several primary clients 5a with a requester 5b connected in front of the primary clients 5a. The requesters 5b represent event-triggering hardware units, for example sensors, and the pertaining control unit firmware. They represent the sources of service requests of the modeled application function.

The primary clients 5a manage the requesters, receive their service requests and dispatch additional tasks to the function monitoring level 7 as required. The primary clients 5a are always established on the same control unit as the pertaining requester 5b and permit the transmitting of the service request, via communication media. The requester 5b is not designed to accomplish this task.

The function monitoring level 7 contains a function monitor 7a for each application function. The function monitor 7a receives and processes the service requests from primary clients 5a and function monitors of superset application functions, as required. For this purpose, the function monitor 7a can use further servers of monitors or primary services which are subordinate to it. The function monitor 7a manages the global condition of the application function and thereby forms its central switching point and memory. Within the function monitoring level 7, optionally one or several monitors 7b are connected behind the function monitor 7a. These monitors 7b manage partial functions and differ from the function monitor 7a in that they do not communicate directly with primary clients 5a and function monitors 7a of other application functions.

The server level 6 contains one or several primary servers 6a and one respective pertaining fulfiller 6b. The fulfillers 6b represent implementing hardware units, for example, actuators, and the pertaining control unit firmware. They represent the sinks of service requests of the modeled application function. The primary servers 6a manage the fulfillers 6b and order these to implement services. They are always established on the same control unit as the pertaining fulfiller 6b and permit the receiving of service requests from remote monitors 7b. The fulfillers 6b are not designed to accomplish this task.

The arrows in FIG. 2 represent the client/server relationships, where the arrows extend from the client to the respective server and represent a certain application protocol. Normally, in this case, the server acts synchronously with the requesting clients. The direction of the arrows indicates this mode of operation. However, in exceptional situations, it is also possible for a server to send information to one or several of its clients in an asynchronous manner. In this exceptional operation, a reversal of the respective roles takes place, for which a separate protocol must be declared.

The designed function of the client/server architecture with the application design structure illustrated in FIG. 2 is based on a plurality of design elements defined as being suitable for this purpose. Here, the design methods provide a special graphical notation for the design elements, which is supportable by graphical design tools. This, in turn, facilitates the readability of designs as well as the learning of the methods in comparison to purely textual notations. Specifically, as design elements, sensor firmware is assigned to the requesters 5b, actuator firmware is assigned to the fulfillers 6b, connections are assigned to the client/server relationships and process classes are assigned to the primary clients 5a, the function monitors 7a, the monitors 7b and the primary servers 6a.

Generally, methods and protocols, service access points (SAP) and service access point interfaces (SAPIF), ports and port interfaces (PortIF), connections, data elements, processes, frames and firmware processes are provided as design elements. In this context, methods represent functionalities which a process class provides to other process classes (as services to the SAPs in the server role). On the other hand, the same process class can request services to SAPs in the client role, which are offered by other process classes, as methods to SAPs in the server role. Similarly to conventional function calls, methods have a type and argument. Here, the type indicates which data format the return value of the method has. For the application, it is irrelevant whether the service request is communicated from the client to the server as a remote procedure call via transmitting/receiving, an external physical communication medium, an interprocess communication or via an event mechanism.

Protocols are used for the aggregation of methods. For this purpose, they contain a list of methods which, from the viewpoint of the application developer, represent a functional unit. Furthermore, protocols may be hierarchically structured. Specifically, a hierarchy of protocols can be constructed such that, starting from a zero protocol, which contains zero methods, a tree structure of protocols is formed. Here, a newly added protocol inherits all methods of the protocol closest to the root of the tree and adds additional ones.

The SAPs are the interfaces of application processes to the layer 7 of the ISO/OSI reference model and each contain one protocol in the client and in the server role, respectively. The SAPs have a preferred direction which corresponds either to the client role or to the server role. Since SAPs may be ends of several client/server communication connections, they contain a corresponding number of ports which are used to anchor the individual communication connections. SAPIFs provide SAP functionality on process and frame class interfaces. Here, one SAP within one process class may have connections to several SAPIFs. Among other things, this provides the possibility of giving the SAPIFs corresponding names, for example, backup light right, backup light left, and thus permit the targeted connection of additional components. In this case, the functionality is fulfilled by a single SAP. SAPIFs exist only during the hierarchical system concept. After the disintegration of the hierarchy before the entity formation, it will no longer be necessary to provide this design element with an equivalence in the implementation.

Ports are anchoring points for bidirectional client/server communication connections during the time of implementation. In this role, they represent a horizontal communication interface on the layer 7 of the ISO/OSI reference model. At the ports, the actual communication mechanism is anchored, i.e., the transmitting/receiving via external physical communication media, the interprocess communication and an event mechanism for the effective communication with firmware processes. Service requests originating from a SAP can therefore be transmitted via different communication mechanisms, depending on the communication mechanism backing the respectively recently addressed port. Analogous to the SAPIFs, the PortIFs provide port functionality at interfaces of process and frame classes described in the following. The PortIFs are either part of the interface of a recently designed frame or part of the interface of a frame or process contained therein.

Each process class can contain data elements which it encapsulates with respect to the object orientation. A data element has a data type, and can be pre-occupied by an initialization value. This data element may be constant or variable and is correspondingly arranged in a ROM or RAM. In addition, the data elements are classified as private elements or public elements. The initiation of private data elements must occur directly during the design of the process class, while that of public data elements occurs on a hierarchically higher design level. Either initiation occurs when the corresponding context is known in which the process class is used. The data elements encapsulated in the process entity may be changed only by the process entity itself.

Figure 3:
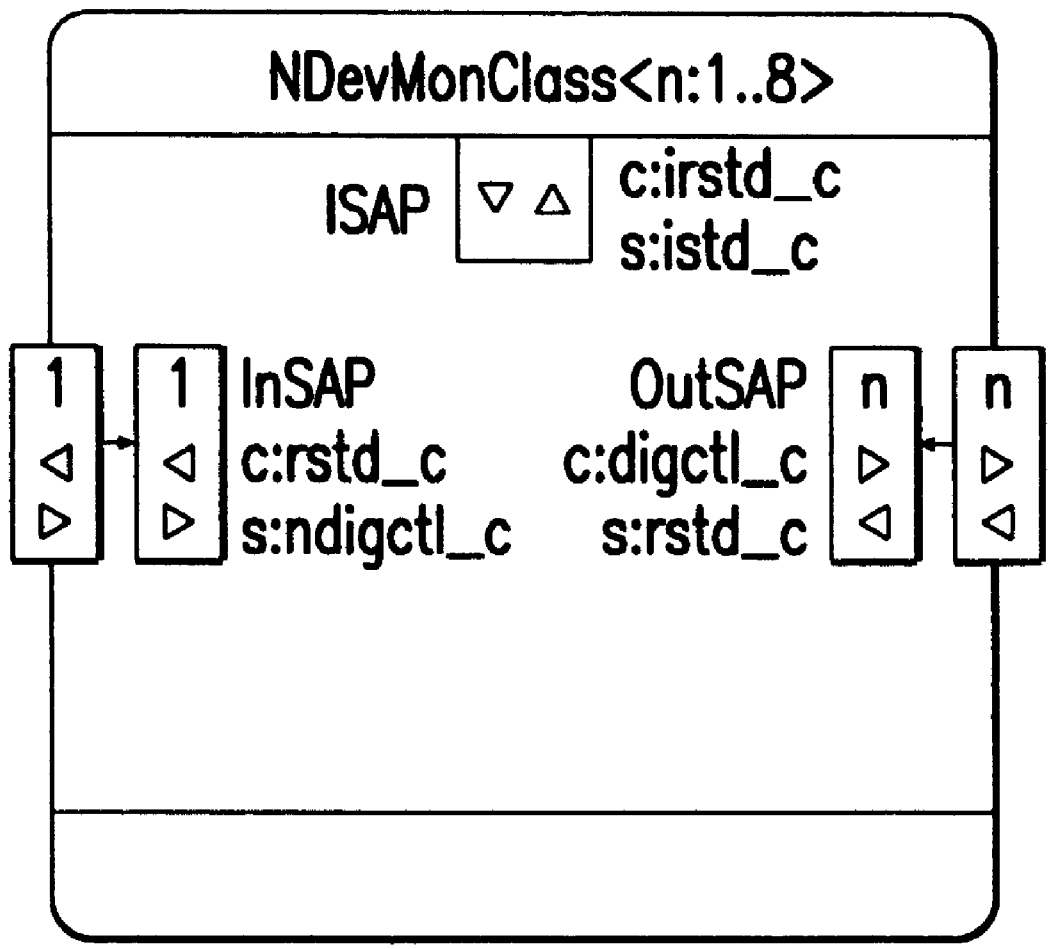
FIG. 3 is a graphical representation of the image of the inner structure of a process class for the client/server architecture.

A process within the framework of the present client/server architecture has interfaces via which it can be connected with other processes or frames. It offers services to SAPIFs in the server role and uses services of other processes to SAPIFs in the client role. The response of a process class is described utilizing finite state machines. Each process class may be considered as a sum of three components. Specifically, these are an outer interface, an inner structure and the response. FIG. 3 illustrates an example of the graphical appearance image of the inner structure of a process class with a pertaining outer interface. The response of a process class reacting to an arriving service request is divided into three partial aspects. Specifically, the response is divided into the change of the inner condition z of the process class, i.e., a finite state machine FSM which represents the response of the process class. Second, the response is divided into the modifications on the encapsulated data elements (process data set). Lastly, the response is divided into the implementation of actions and (optimally) the changing of the process into the client role in order to use services of other processes.

Figure 4:
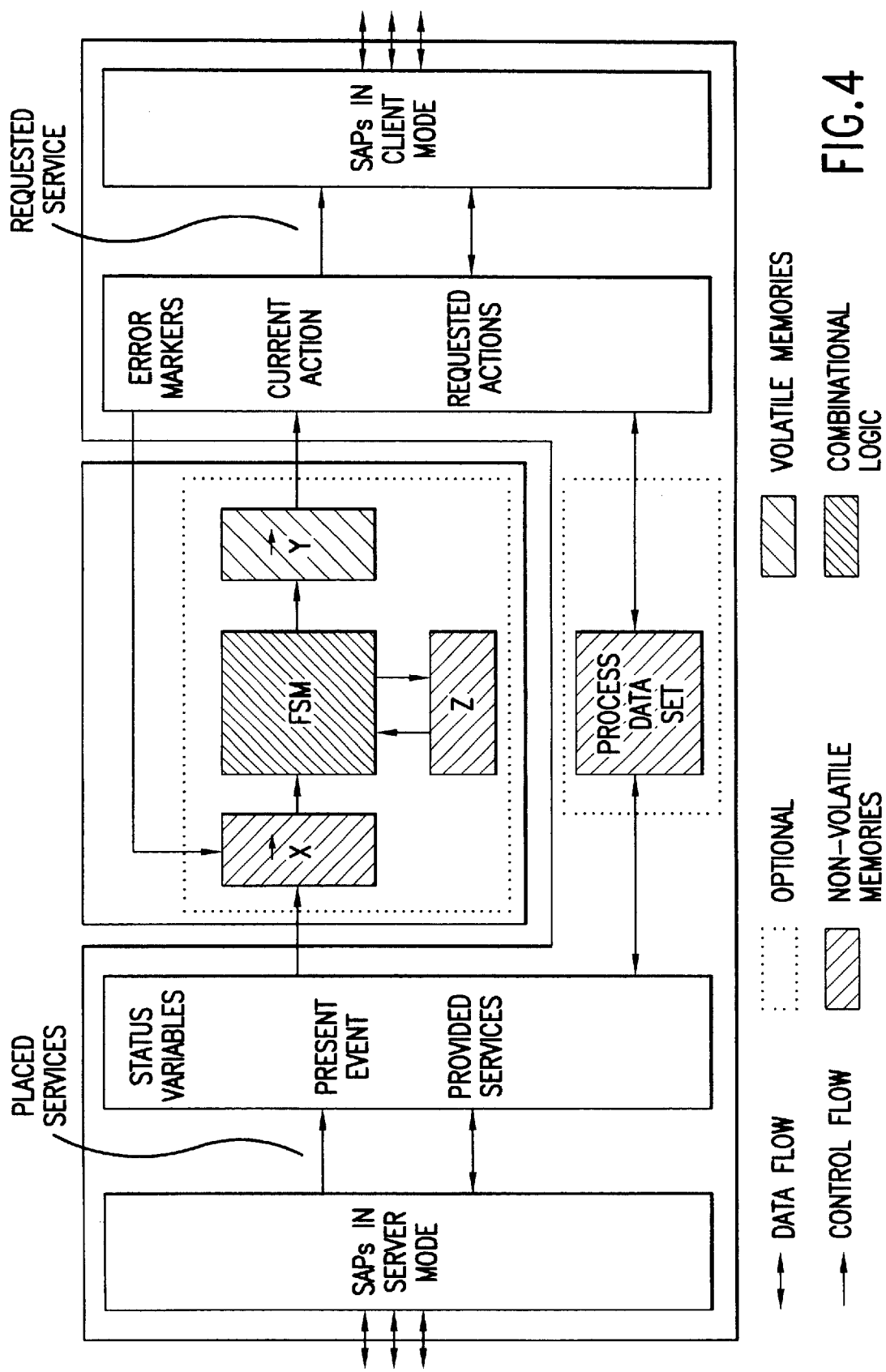
FIG. 4 is a graphical representation of the embedding of a finite state machine into a process class of the client/server architecture.

FIG. 4 shows the embedding of the finite state machine (FSM), into the process class. As shown in FIG. 4, arriving service requests can influence the x-vector of the finite state machine as well as the process data set. If the x-vector changes, whether a new condition may be reached and corresponding actions must be carried out is determined. This check is performed according to the definition of the finite state machine. Which actions are performed is the result of the interpretation of the y-vector. The implementation of actions may mean further changes to the process data set, along with a change to the client role upon the request of services of other processes. FIG. 4 further shows the characteristic measure of implementing the SAPs in the server and client mode at the application level.

In order to permit a hierarchical software design, frames are provided as additional design elements. These design elements, in their internal structure, may encapsulate further frames, processes and necessary connections. Like a process, a frame has interfaces via which it can be connected to other processes or frames. It offers services to SAPIFs in the server role and uses services from other processes to SAPIFs in the client role. Basically, frames may be additionally provided with a response description which may result in a correlation with processes. As a result, only one of these two design elements is still required at the design level. Here, for the implementation of an application for all process classes, explicit response descriptions must exist at the hierarchically lowest design level. In contrast, this is optional for process classes at hierarchically higher levels. As a result, their response description must then match the response description of the processes classes of the lower level contained in it.

As a further development of embodiments of the present invention, firmware processes are provided with which firmware is characteristically described as processes. These firmware processes also form the link between a respective hardware component and exactly one assigned primary client or server. They communicate with the latter via application protocols, since they are also used for the communication between the processes and therefore also have at least one SAPIF. However, in contrast to processes, neither the inner structure nor the response of firmware processes is described. However, data elements can be used.

Figure 5:
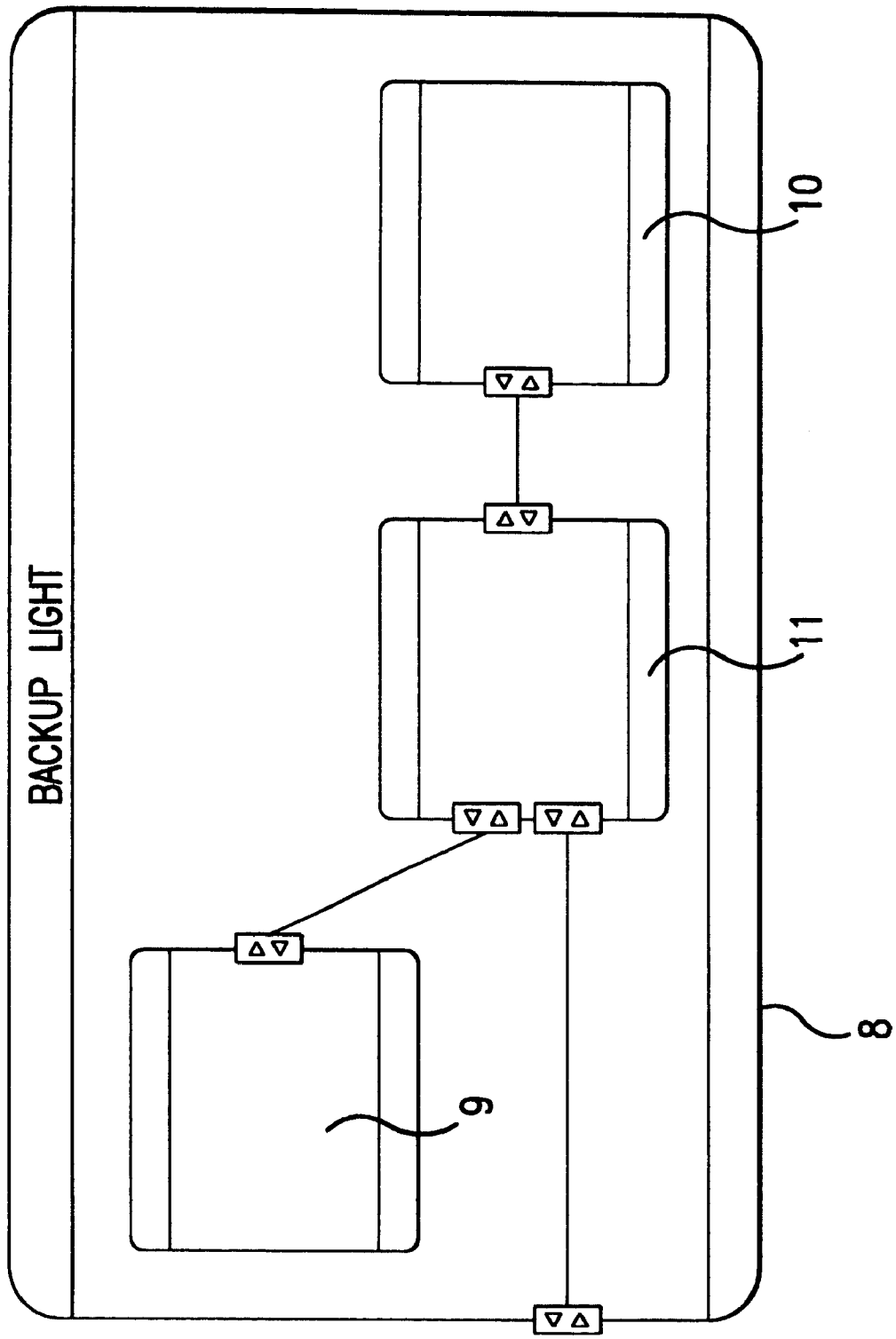
FIG. 5 is a graphical representation of the client/server design for the example of a backup light application function.

Regarding the typical vehicle-specific "backup light" application function, FIG. 5 illustrates, as an example, the basic approach during the designed function according to the present client/server model. For this purpose, the graphical representation of FIG. 5 shows an outer frame 8 which contains two inner frames 9, 10 and a process represented by the graphics of its outer interface 11. In the first step, the identification of the participating sensor system and actuator system and therefore the determination of the primary clients and servers takes place. In the example as illustrated, the function is activated by a switch on the shifting gate of an automatic transmission. As the actuator, an electric bulb is switched on at the vehicle rear end. A primary client for monitoring the backup switch and a primary server for triggering the digital light end phase for the backup light are therefore obtained as the end points of this client/server scenario. The actual function logic is situated in a monitor which, in this case, only links the switching condition with the ignition terminal information so that the backup light is not switch ed on when the ignition is switched off.

After the structure of the function has been determined in this manner, the protocols between the clients and the servers are defined in the next step. Here, a protocol consists of a number of services which the server offers to the client. In the example of a binary switch, only the information "switch-switched on" or "switch-switched off" must be exchanged between the primary client and the monitor. In the case of the actuator system control, only two services are also obtained which the primary server must offer to the function monitor, specifically "switch on end phase" and "switch off end phase."

A look into a parts library, formed during the development, may show that a protocol for transmitting binary information already exists. In the example, this can be used for the communication between the primary client and the monitor, as well as between the monitor and the primary server. The corresponding processes and protocols for feeding the ignition terminal information into this function scenario are also already contained in the parts library. Here, this is a communication connection to that client which is sufficient to transmit the actual ignition terminal to the function monitor.

In the following, the implementation of the client/server architecture in the vehicle is discussed in greater detail. The operating system utilized forms a basic component. In order to ensure the portability of the client/server processes to different hardware platforms, an operating system layer is implemented on the control units. This operating system layer encapsulates the dependencies of the software with respect to the hardware and provides an abstract application programming interface (API). A prerequisite for the use of the client/server architecture in a control unit is a real-time-capable multitasking operating system. For example, the real-time operating system OSEK with the Conformance Class ECC1 can be selected because the event mechanism is required for the communication. The mutual interruptability of individual tasks, that is, a preemptive scheduling, is not absolutely required.

Figure 6:
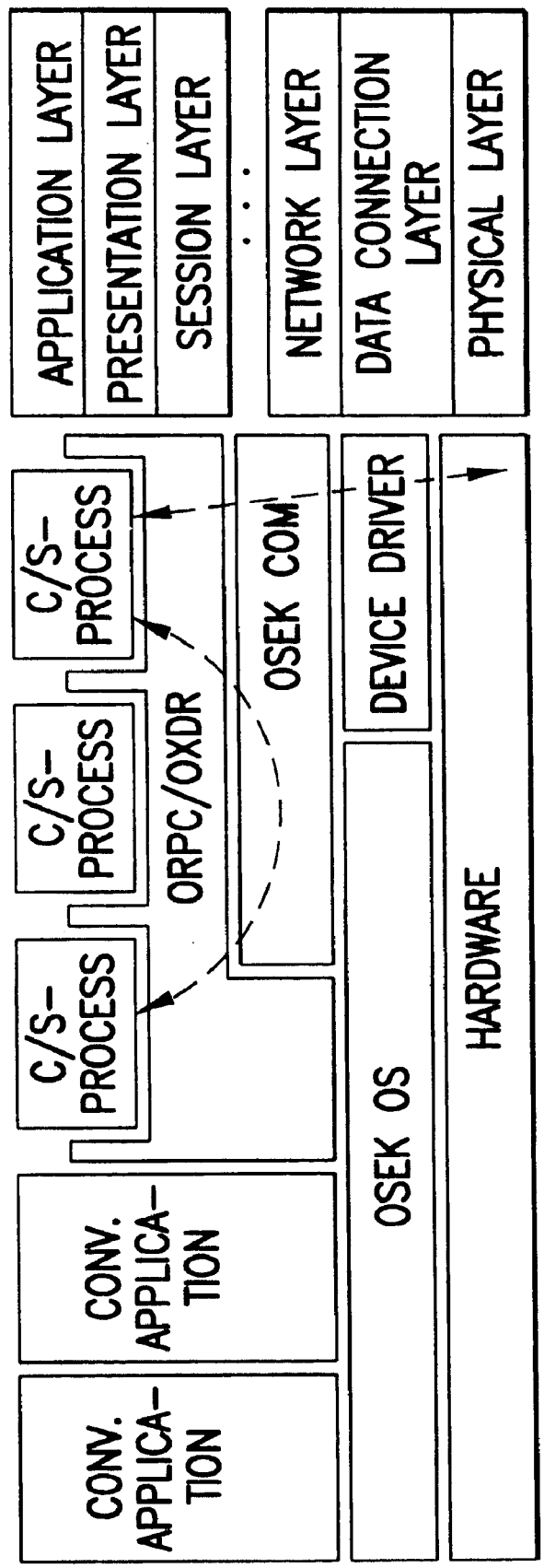
FIG. 6 is a block diagram of the control unit software used for the client/server architecture.
Figure 7:
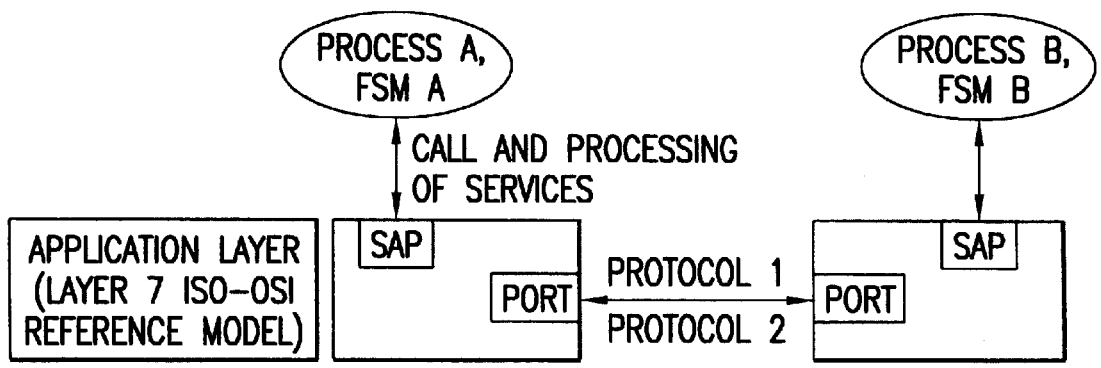
FIG. 7 is a block diagram representation of the process communication of the client/server architecture via protocols on the application layer level.

FIG. 6 shows the structure of software modules on a control unit with the present client/server architecture, as well as the coexistence with conventional applications. Here, the layers of the ISO/OSI reference model are additionally illustrated for comparison purposes. FIG. 6 shows that the client/server processes do not have direct access to the hardware but use the services of the operating system, the ORPC communication layer and thus the OSEK COM. Here, the communication relationships between client/server processes are indicated by broken lines. The curved line represents a client/server communication on the same unit, while the straight line symbolizes a client/server communication between different units. By means of this structure, a displaceability of the client/server application can be achieved between different control units which all have corresponding OSEK OS, OSEK COM and ORPC-OXDR implementations. FIG. 7 shows the measure taken in this case for implementing the SAPs and the ports for the interaction of processes via protocols at the level of the layer 7 of the ISO/OSI reference model.

As mentioned previously, the client/server applications make use of services of a communication layer. In this case, the ORPC (OSEK-based remote procedure call) layer is based on the timer and event services of the operating systems and the communication routines of the OSEK COM level. The OSEK COM layer provides communication routines via which the tasks can exchange data with one another. The communication of two tasks takes place as a function of the configuration within the same address space or between different address spaces via a corresponding transport medium. In this case, the actual implementation of the communication remains hidden from the application. The communication levels ORPC, OSEK COM, device drivers and hardware form the layers 6 through 1 of the ISO/OSI reference model. The monitor layer 7 (that is, the application layer) is directly taken over by the client/server application or the application protocols.

The process structure of the clients and servers describes the system response within the architecture. By this, however, in contrast to conventional client/server systems, no interaction with the outside world is modeled. In the present CSA, this interface with the outside world is formed by additional software modules, i.e., the so-called firmware. This firmware separates the hardware-dependent parts of the function from the logic functions of the client/server system. In it, the input and output operations of the control unit are processed. Normally, these are the triggering of I/O pins of the processor with a defined timing. The firmware, especially for the control unit, is implemented close to the hardware, for example, in assembler or C. For the client/server environment, the firmware provides an interface via application protocols in a manner similar to those of client/server processes. Those client or server processes which receive orders from the firmware or give orders to it are called the primary clients or servers. As a result, these primary processes run directly on the control unit to which the corresponding hardware is also connected. By way of this intermediate layer, a communication is also conceivable to processes other than the client/server processes. Specfically, for the corresponding application, an interface to the client/server environment is implemented in the form of corresponding firmware.

Between two client/server processes, the communication for the data exchange takes place via two asynchronous unidirectional point-to-point channels. They are based on the principle of the remote procedure call (RPC) known from office communication data processing. Here, this mechanism is adapted and simplified for application in motor vehicles with respect to the limited resources existing there. Thus, for example, no name services or security functions are available. Generally, in addition, no secure communication is required for the exchange of messages.

Figure 8:
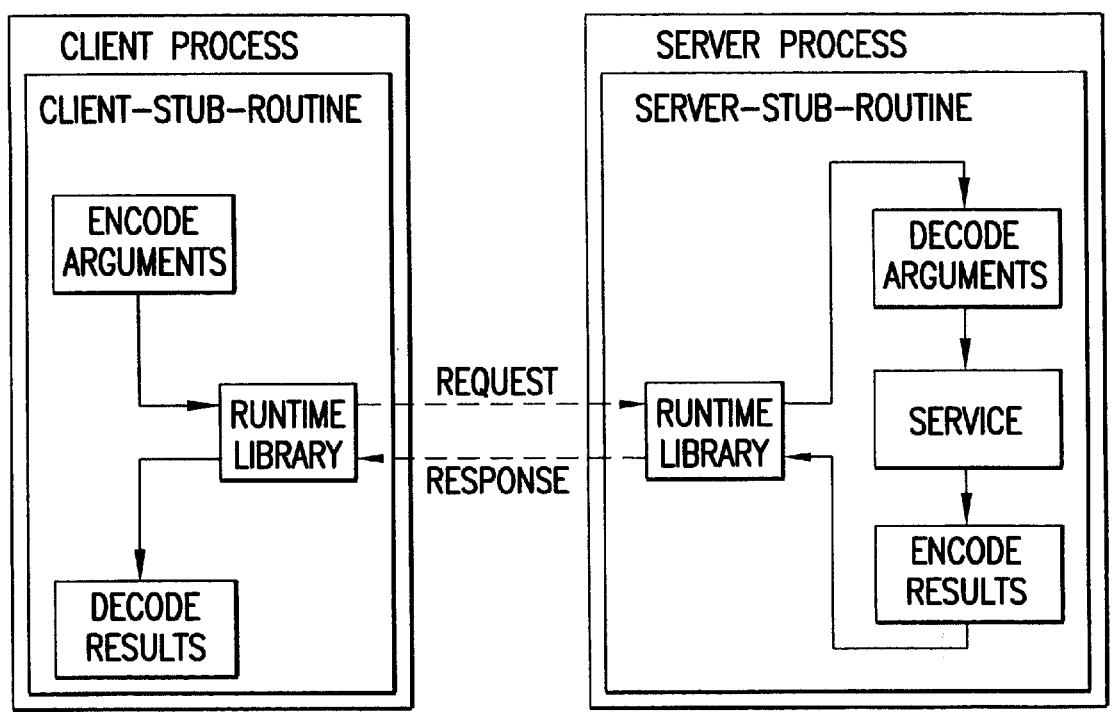
FIG. 8 is a block diagram of a basic ORPC sequence in the client/server architecture.

The basic sequence of the used OSEK-based remote procedure call (ORPC) is illustrated in FIG. 8. In the case of a request from a client process to a server process, a stub routine first encodes the arguments in a network-neutral normalized form. The timed RPC provided in the ORPC runtime library ensures the transmission of the request via the network or via communication objects in the same address space to the server. There, the corresponding server stub routine decodes the arguments, calls the service implementation via these parameters and then receives the results. These are reconverted into the normalized representation and sent back to the client. The client stub routine provides the decoding of the results and finally returns them to the corresponding process.

For the event that a message is lost during the transmission via a medium between different address spaces, a mechanism is implemented in the ORPC which can repeat messages. For this purpose, it is defined for each message by which point in time (after the sending of the request) the reply is expected. If this time cannot be met, the client assumes that either the request message or the reply to it was lost. It therefore sends the request again. In addition, a maximum number is defined for the repetitions, after which the client receives a corresponding fault report concerning the non-fulfillment of the service. By means of this mechanism, only valid services can be implemented. Here, a repetition of a previously implemented service has no influence on the overall result or the system condition.

Figure 9:
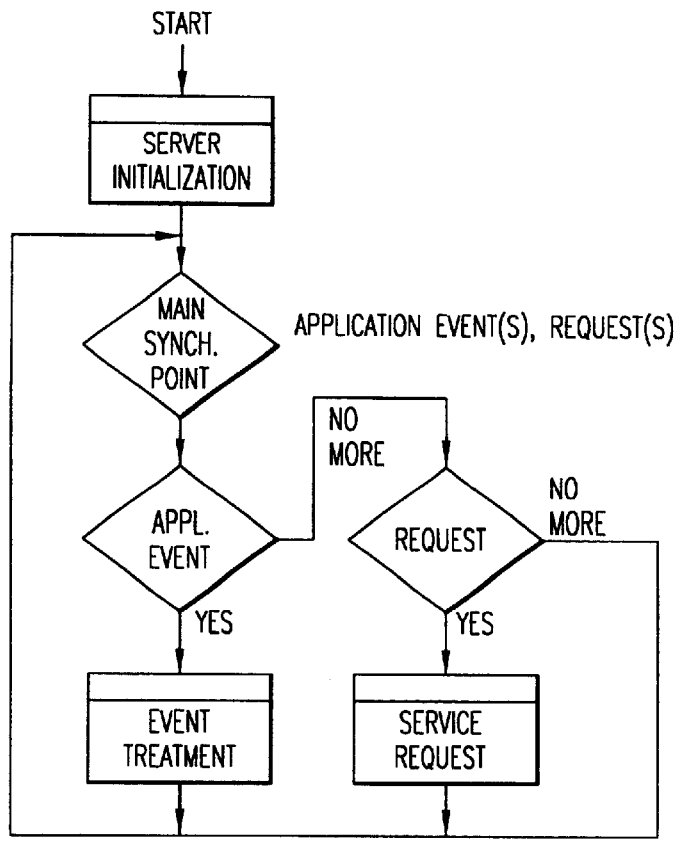
FIG. 9 is a flow chart of the server operating sequence in the client/server architecture.
Figure 10:
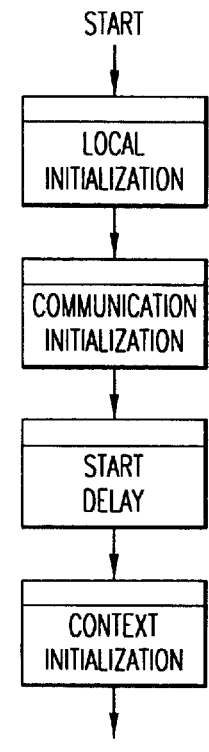
FIG. 10 is a flow chart of the sequence of a server initialization phase.

In contrast to conventional implementations of RPC mechanisms for office communication, in the case of the present CSA, a greater functionality is implemented and standardized within the ORPC library routines. Common RPC implementations provide the application only with the required communication functions in the form of a library. In addition, they only permit the generation of a primitive framework for the actual server functionality. If this is insufficient, which is usually the case, the application programmer must write the required server code. In contrast, in the present case, the ORPC library, in addition to the communication routines, also contains the complete server code. This server code is processed by all client and server processes. Specifically, the server code is integrated exactly once per control unit. This advantageously meets the requirements of minimal resource demands and maximal reusability. This server code is called upon by the application only via the respective process-specific data and processes these according to a determined process. The pertaining server condition diagram is illustrated in FIG. 9. After being called by the application, the server passes through an initialization phase which is divided into four individual phases, as illustrated in the pertaining initialization diagram in FIG. 10.

First, the application-specific process data are initialized. To accomplish this, an application-specific function is called from the server code. This function is provided by the application programmer. Next, the initialization of the communication channels and the pertaining data objects occurs. The server process is now ready to receive requests from its clients. Next, for an adjustable time period, the process will enter a waiting position until a request has been received or the set time has expired. This measure is used for the load distribution at the start of the system, or to block less important processes until they are actually needed. Finally, the server checks whether it has all the necessary initialization information. If this is not the case, it automatically, i.e., without any participation of the application, requests it from the corresponding clients. If after an adjustable number of attempts, no valid initialization is present, the server branches off into an emergency function. Otherwise, the server enters a loop in which it successively processes the received requests.

Pending requests are indicated to the server process via a signalizing mechanism provided by the operating system. By means of this signal, the server can differentiate between different sources and trigger the corresponding processing method. The source of these signals may be non-CSA functions (for example firmware), or operating system functions (for example, timers or interrupt mechanisms) or other CSA processes (for example, client processes). By means of the received signal, the server code calls a stub routine via a table on the corresponding SAP. The stub routines are automatically generated via the information concerning the application protocols and call the service implementation provided by the application programmer. These signals are divided into so-called application events and ORPC events. The application events are used for the linking of the firmware and for operating system functions and are converted directly into a corresponding call. The ORPC events are defined by the implemented RPC mechanism and are used for the linking to other CSA processes.

Figure 11:
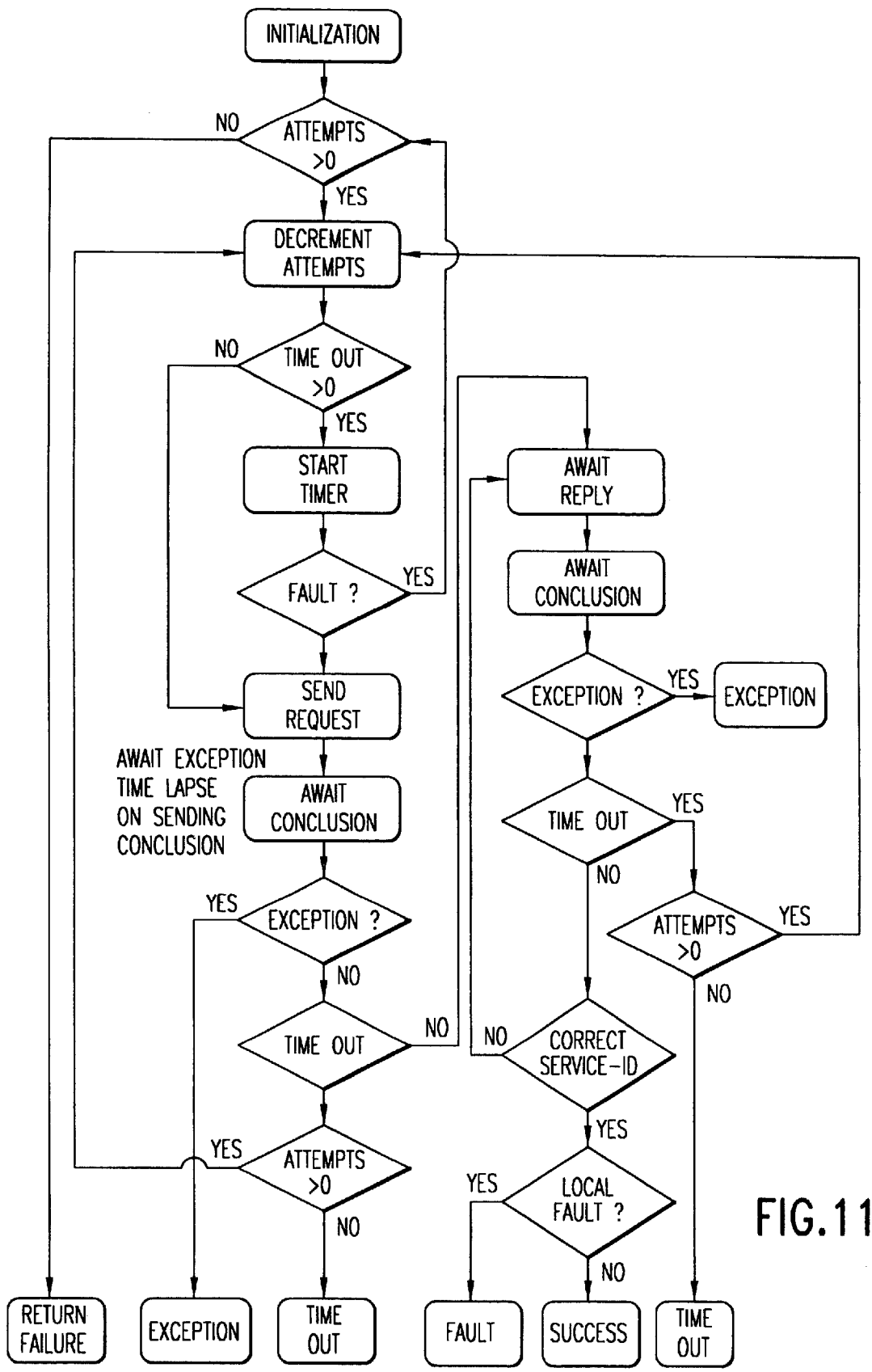
FIG. 11 is a flow chart of a synchronous RPC implementation.

For the implementation of the RPC, three embodiments can be used, of which the most common one is a so-called synchronous RPC which is implemented by the function timed RPC of the ORPC library. FIG. 11 shows the flow chart of this function. After the initializing of the local data of the function, the call attempts configured for this method are processed in a loop. During each attempt, a timer is first assigned the corresponding time-out value for this purpose. Then the request is sent and the conclusion of this send operation is sought. If the sending of the request was successful, the function enters a loop in which it awaits the reply. If the reply is not received within the defined time period, another transmission attempt is begun if the number of possible attempts has not yet been exceeded. If the timer expires before a successful conclusion of the sending operation was indicated, the next attempt is commenced without waiting for a reply.

On the server side, a corresponding server stub routine is called by the reception of a request. In turn, this server stub routine calls the actual service implementation and after its processing sends back a corresponding reply to the client process. Depending on the conclusion, the function supplies a corresponding fault code. In the event of a success, the pertaining result is also sent back to the calling function (in this case, a client stub routine). Within the application, in the case of an RPC, this fault code must be considered first. In the case of a success, the fault code must be considered before processing can take place via the supplied result. For the event that an RPC operation fails, a corresponding fault treatment must be provided by the application programmer.

In another variation of the three embodiments, a so-called asynchronous RPC may be provided. This asynchronous RPC corresponds to a modification of the synchronous RPC in that the server stub routine sends a reply before the actual service implementation is called. As a result, the client process can continue to operate asynchronously to the server process ordered by it. Here, the server process or the called stub routine confirms (by the reply) only the correct reception of the corresponding request and not the completed processing. Therefore, this type of RPC is permissible only for methods which have no result, that is, a return value of the "void" type. The differentiation between a synchronous and an asynchronous RPC takes place only in the server stub routine, while the client stub routines which are utilized are identical in both cases. Also in both cases, the function timed RPC is requested for the communication.

Figure 12:
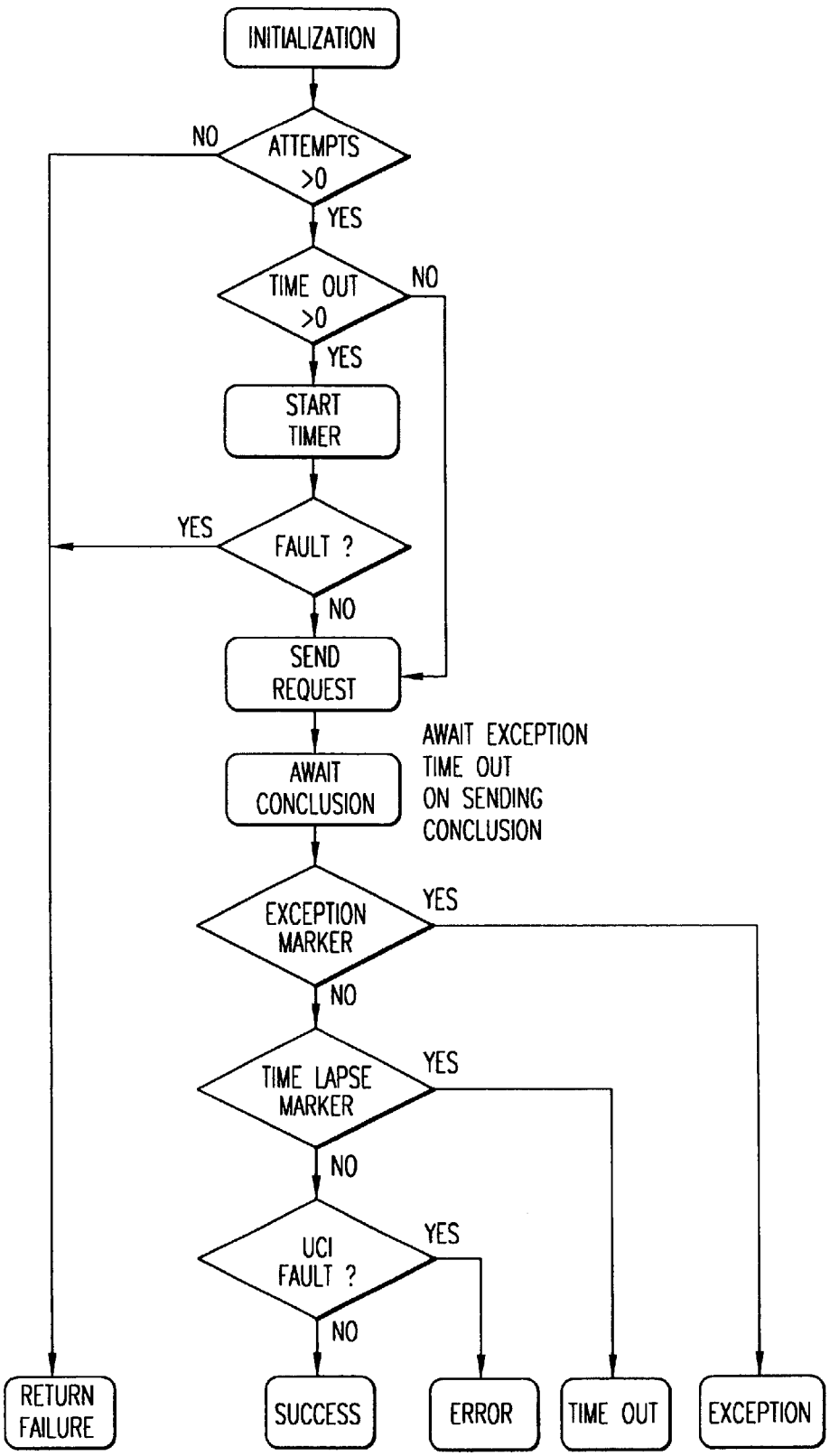
FIG. 12 is a flow chart of a one-way RPC implementation.

In another variation of the three embodiments, the so-called one-way RPC may be provided. Here, in contrast to the two previous variations, no response is generated from the server to the client. This variant is also only permissible for functions which supply no result. In contrast to the timed RPC, the communication function one-way RPC utilized implements no time-out retransmit mechanism and does not wait for a reply of the server. The flow chart which is part of this RPC variant is illustrated in FIG. 12.

In addition to calling the corresponding communication function or service implementation, the client and server stub routines have the responsibility of carrying out the so-called marshalling. Specifically, stub routines are responsible for converting a simple data type from a processor-specific representation into the normalized format used for the communication, and for performing an unmarshalling. Here, unmarshalling refers to the data conversion from the normalized format into the process-dependent representation of the pertaining parameters and return values. In this case, byte and bit ordering and the length of the representation are taken into account. The client and server stub routines are automatically generated via the signature of a method, that is, taking into account the number, sequence and type of the parameters as well as the return value. The stub routines contain the corresponding call sequence of conversion routines for simple data types.

In the case of conventional implementations, the application programmer must provide functions for the marshalling and unmarshalling and transmit them to the stub routine. However, in the present system, this functionality is, as a result of the stub routines, completely encapsulated within the stubs and is hidden to the application. Subsequently, the RPC implemented in the present CSA is transparent with respect to the interface for the application programmer. Specifically, via the selected approach, the interface of the application to the stub routines is designed such that it corresponds precisely to that of a local function call. Exactly one pair of stub routines exists for each signature, in which case methods with the same signature use the same stub routines. This must be differentiated from the method-specific generation of stub routines of conventional implementations. In contrast to conventional architectures, the present CSA uses the possibility of a use/reuse of stub routines by several methods.

A condition which limits the normalized representation in a network is that, for the microcontrollers which are utilized, the expenditures for the conversion must be as low as possible. Therefore, instead of a conventional implementation of an external data representation (for the present system), an independent normalized representation was defined in the form of an OXDR (OSEK-based external data representation). Conversion routines for simple data types are provided in a library. OXDR is characterized by a separation of marshalling and unmarshalling routines, which permits a selective integration of the required modules and thus a minimal ROM requirement. In addition, for the data conversion, the source and target data area may be identical. This minimizes the RAM requirement of the conversion routines.

For the implementating protocol, each method of an application protocol receives an unambiguous number which is called a service number. By means of this number, the client identifies the desired service and the server identifies the respective service implementation. In the messages (i.e., the type of message), the request, reply or error, as well as the service number and the transmitted data are encoded in the uses data.

Figure 13:
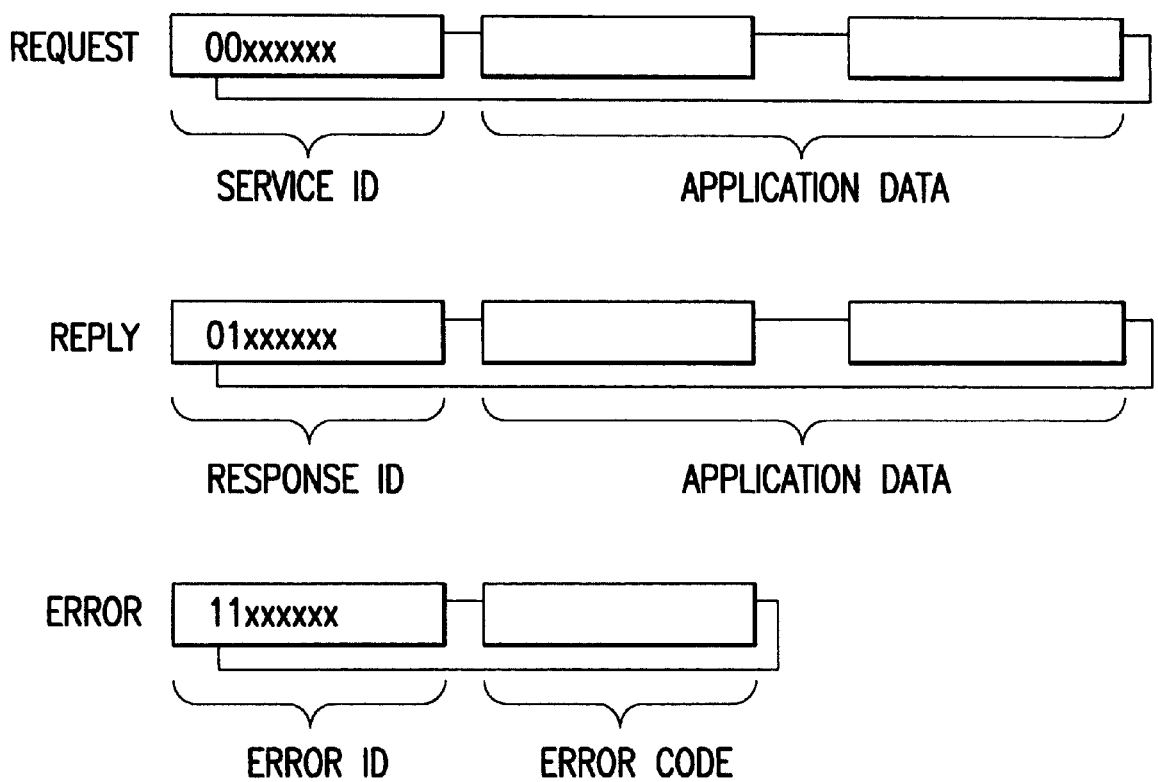
FIG. 13 is a schematic block diagram representation of the implemented protocol of the client/server architecture.

FIG. 13 shows a representation of the thus implemented protocol. In this case, bit 7 is an error flag, bit 6 is a reply flag and the bits 5 through 0 are the service ID between 0 through 63. The starting bits "00 . . . " indicate a request for the service with the number which follows, the starting bits "01 . . . " indicate a reply to the service call with the number which follows and the starting bits "11 . . . " indicate an error during the processing of the service with the number which follows.

The application data is the data transmitted when the method is called and the reply is sent to them. The client therefore sends a message with a service number to its server which, via the canceled bits 6 and 7 and the service number, checks whether a request is involved or whether it can perform this request. After successful processing of the service, the server sends the results under the same service number with the set bit 6 back to the client. By the service number (the set bit 6 and the canceled bit 7), this client recognizes that this is a valid result with respect to the called service. If the server cannot perform a requested service, it replies to the request via a fault message. Specifically, it sets the bits 6 and 7 and encodes the corresponding fault in the application data.

As a result, an object-oriented solution is therefore provided for the control system. Here, all processes used in the CSA have one or several defined interfaces in the form of SAPs and SAPIFs via which communication with them is performed using application protocols. The processes may have local data which can be only modified via application protocols. Further, they are internal in nature because the response of such a process is determined via a simple finite state machine (FSM). Thus, the design with the client/server method follows the essential paradigms of the object-oriented design. The design of the application takes place on a class level by establishing communication relationships between the process classes. At the moment of generation, the process entities are generated from these communicating process classes and are pre-occupied with corresponding data. Here, a polymorphism is also conceivable at this point by overwriting the service implementations.

As hierarchical structuring devices, frames are used which may contain other frames or process classes, firmware or communication connections, i.e., a so-called construction of parts. From these frames, according to the design method, i.e., by the construction from parts, the application can then be assembled. A frame which has been established, implemented and tested once, can be reused in an arbitrary number of applications so that a considerable rise of efficiency and effectiveness can be achieved in comparison to the conventional design. By means of the presently implemented CSA, a high flexibility is also achieved in the field of motor vehicle electronics and permits a series-spanning use of application functions or at least of parts thereof. If, for example, in the case of a new vehicle series, an application function is changed only with respect to its functional logic, but not in its pertaining sensor or actuator system, a modification of the corresponding function monitor will be sufficient. The present structuring of functions therefore also improves the serviceability.

The development process is formally supported by a design and implementation tool with which the whole design process and parts of the implementation process are supported. As a result, the process classes can be specified in the design phase with their interfaces and data. Together with the developed application protocols, they can be combined into frames. These frames, in turn, can be used in other frames. At the conclusion of the design process for a new function, the context is determined in which the frames are used, for example, for determining the frequency and the pulse width repetition rate in the case of the flashing function of a vehicle turn signal. A parts library is established from the functions designed via the development tool.

As illustrated by the above description of an application for a motor vehicle, the control system according to the invention having the implemented client/server architecture offers considerable advantages. The development expenditures are simplified by the systematic reuse and modification ease, as well as the extensive automation. For this purpose, a clear separation is implemented between the logic design of a vehicle function and its physical installment in the control unit structure. In addition to designed functions, corresponding simulated models and implemented software modules can also be used in a flexible manner. This reduces expenditures, not only in the design phase but also in the implementation and integration phase. By means of the system design according to the invention, a high degree of freedom is achieved with respect to placing individual functions on the control units in the networked control unit arrangement.

Although the invention was discussed in detail with reference to a motor vehicle control system, it is understood that it can also be applied to other types of data-processing-aided electronic control systems having a multiple control unit arrangement which consists of control units arranged in a distributed manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data-processing-aided vehicle electronic control system, comprising:
   a multiple control unit arrangement for performing application functions, said multiple control unit arrangement comprising:
   a plurality of control units arranged in a distributed manner; and
   a data transmission network interconnecting the plurality of control units to each other;
   wherein the application functions are implemented in the multiple control unit arrangement in a client/server architecture, wherein the client/server architecture for a respective application function comprises a client level, a server level and a function monitoring level situated between the client level and the server level; and further
   wherein the monitoring level receives service requests from the client level and/or from the superset application functions and the monitoring level processes the service requests and functions while utilizing services of the server level and/or of subordinate application functions wherein the client level further comprises:

at least a primary client and pertaining requester, said requester representing event-triggering hardware units and a respective control unit firmware;

wherein the primary client which manages the requester, receives service requests and dispatches orders to the function monitoring level, and/or for each respective application function, in order to manage partial functions, the function monitoring level contains a function monitor which receives and processes service requests from the client level, and/or the server level contains at least a primary server and a pertaining fulfiller, said fulfillers representing implementing hardware units and pertaining control unit firmware, and the primary server manages the fulfiller and requests it to perform services and receives service requests from the function monitoring level.

2. The control system according to claim 1, further comprising:

service access points (SAPs) which form application process interfaces on a level of a layer of an ISO/OSI reference model and contain one protocol in a client role and a server role, respectively;

wherein the service access points are a group of design elements for a designed function of the client/server architecture.

3. The control system according to claim 1, further comprising:

service access points (SAPs) which form application process interfaces on a level of a layer of an ISO/OSI reference model and contain one protocol in a client role and a server role, respectively;

wherein the service access points are a group of design elements for a designed function of the client/server architecture.

4. The control system according to claim 1, further comprising:

ports for horizontal communication interfaces on a layer of an ISO/OSI reference model;

wherein the ports are a group of design elements for a designed function of the client/server architecture and anchoring points for a bidirectional client/server communication connection during a time of implementation.

5. The control system according to claim 1, further comprising:

ports for horizontal communication interfaces on a layer of an ISO/OSI reference model;

wherein the ports are a group of design elements for a designed function of the client/server architecture and anchoring points for a bidirectional client/server communication connection during a time of implementation.

6. The control system according to claim 2, further comprising:

ports for horizontal communication interfaces on a layer of an ISO/OSI reference model;

wherein the ports are the group of design elements for the designed function of the client/server architecture and anchoring points for a bidirectional client/server communication connection during a time of implementation.

7. The control system according to claim 1, further comprising processes having process classes, said process classes comprising:

an outer interface;

an inner interface; and a response containing changes of an internal condition of a process class, modifications on encapsulated data elements and an implementation of actions;

wherein the processes are a group of design elements for a designed function of the client/server architecture.

8. The control system according to claim 1, further comprising processes having process classes, said process classes comprising:

an outer interface;

an inner interface; and a response containing changes of an internal condition of a process class, modifications on encapsulated data elements and an implementation of actions;

wherein the processes are a group of design elements for a designed function of the client/server architecture.

9. The control system according to claim 2, further comprising processes having process classes, said process classes comprising:

an outer interface;

an inner interface; and a response containing changes of an internal condition of a process class, modifications on encapsulated data elements and an implementation of actions;

wherein the processes are the group of design elements for the designed function of the client/server architecture.

10. The control system according to claim 4, further comprising: processes having process classes, said process classes comprising:

an outer interface;

an inner interface; and a response containing changes of an internal condition of a process class, modifications on encapsulated data elements and an implementation of actions;

wherein the processes are the group of design elements for the designed function of the client/server architecture.

11. The control system according to claim 1, further comprising:

an operating system layer with a real-time-capable multitasking operating system implemented in the control units; and a communication layer of a remote procedure call type;

wherein the client/server processes utilize services of the operating system and the communication layer without any direct hardware access.

12. The control system according to claim 1, further comprising:

an operating system layer with a real-time-capable multitasking operating system implemented in the control units; and a communication layer of a remote procedure call type;

wherein the client/server processes utilize services of the operating system and the communication layer without any direct hardware access.

13. The control system according to claim 2, further comprising:

an operating system layer with a real-time-capable multitasking operating system implemented in the control units; and a communication layer of a remote procedure call type;
wherein the client/server processes utilize services of the operating system and the communication layer without any direct hardware access.

14. The control system according to claim 4, further comprising:
an operating system layer with a real-time-capable multitasking operating system implemented in the control units; and
a communication layer of a remote procedure call type;
wherein the client/server processes utilize services of the operating system and the communication layer without any direct hardware access.

15. The control system according to claim 11, further comprising:
an operating system layer with a real-time-capable multitasking operating system implemented in the control units; and
a communication layer of a remote procedure call type;
wherein the client/server processes utilize services of the operating system and the communication layer without any direct hardware access.

16. The control system according to claim 11, wherein a complete server code is filed in an RPC library, integrated exactly once per control unit and processed by all client processes and server processes.

17. The control system according to claim 11, wherein the RPC operation for the communication layer is implemented as one of a synchronous, an asynchronous and a one-way RPC operation.

18. The control system according to claim 16, wherein the RPC operation for the communication layer is implemented as one of a synchronous, an asynchronous and a one-way RPC operation.

19. The control system according to claim 11, wherein a message protocol contains information regarding a message type, a service number of a respective method of an application protocol and data for transmission.

20. The control system according to claim 16, wherein a message protocol contains information regarding a message type, a service number of a respective method of an application protocol and data for transmission.

21. The control system according to claim 17, wherein a message protocol contains information regarding a message type, a service number of a respective method of an application protocol and data for transmission.

* * * * *